(12) United States Patent
Ray et al.

(10) Patent No.: US 9,965,875 B2
(45) Date of Patent: May 8, 2018

(54) VIRTUAL PROJECTION IMAGE METHOD

(71) Applicant: Carestream Health, Inc., Rochester, NY (US)

(72) Inventors: Lawrence A. Ray, Rochester, NY (US); Richard A. Simon, Rochester, NY (US); Levon O. Vogelsang, Webster, NY (US)

(73) Assignee: Carestream Health, Inc., Rochester, NY (US)

( * ) Notice: Subject to any disclaimer, the term of this patent is extended or adjusted under 35 U.S.C. 154(b) by 203 days.

(21) Appl. No.: 15/187,834

(22) Filed: Jun. 21, 2016

(65) Prior Publication Data

US 2017/0365076 A1 Dec. 21, 2017

(51) Int. Cl.
*G06K 9/00* (2006.01)
*G06T 11/00* (2006.01)
*G06T 5/00* (2006.01)

(52) U.S. Cl.
CPC ............ *G06T 11/008* (2013.01); *G06T 5/002* (2013.01); *G06T 2207/10081* (2013.01)

(58) Field of Classification Search
None
See application file for complete search history.

(56) References Cited

U.S. PATENT DOCUMENTS

| 7,599,464 | B2* | 10/2009 | Raupach | A61B 6/032 378/19 |
| 7,602,879 | B2 | 10/2009 | Chen et al. | |
| 8,923,589 | B2* | 12/2014 | Noda | G06T 11/006 382/131 |
| 9,224,216 | B2 | 12/2015 | Zamyatin et al. | |
| 2005/0152590 | A1* | 7/2005 | Thieret | G06T 11/006 382/131 |
| 2006/0133564 | A1* | 6/2006 | Langan | G01N 23/046 378/8 |
| 2008/0152076 | A1* | 6/2008 | Hagiwara | G03B 42/02 378/20 |

(Continued)

OTHER PUBLICATIONS

Matthias Bertram et al., "Directional View Interpolation for Compensation of Sparse Angular Sampling in Cone-Beam CT," IEEE Transactions on Medical Imaging, vol. 28, No. 7, Jul. 2009, pp. 1011-1022.

*Primary Examiner* — Shervin Nakhjavan (57) ABSTRACT

A method of generating a synthesized digital projection image, executed at least in part by a computer, acquires x-ray projection images at corresponding acquisition angles, and reconstructs a first volume image. Forward projection generates a preceding forward projection image at a first acquisition angle; a following forward projection image at an adjacent second acquisition angle; and an intermediate forward projection image for an intermediate angle. A synthesized projection image is formed by identifying a candidate patch of pixels from the intermediate forward projection image, matching a first patch of pixels from the preceding forward projection image and identifying a corresponding first acquired patch of pixels from the first acquired x-ray projection image, matching a second patch of pixels from the following forward projection image and matching a second acquired patch of pixels from the forward projection image. The first and second acquired patches are combined.

15 Claims, 8 Drawing Sheets

(56) References Cited

U.S. PATENT DOCUMENTS

| | | | |
|---|---|---|---|
| 2010/0215233 A1* | 8/2010 | Hsieh | A61B 6/032 382/131 |
| 2011/0142314 A1* | 6/2011 | Hsieh | A61B 6/032 382/131 |
| 2012/0278055 A1* | 11/2012 | Schweizer | A61B 6/037 703/11 |
| 2013/0114871 A1* | 5/2013 | Berkus | A61B 6/5205 382/131 |
| 2013/0136333 A1* | 5/2013 | Dennerlein | G06K 9/00 382/132 |
| 2014/0003688 A1* | 1/2014 | Hansis | A61B 6/032 382/130 |
| 2014/0023290 A1* | 1/2014 | Barth | G06T 5/001 382/275 |
| 2014/0140601 A1* | 5/2014 | Litvin | G06T 11/005 382/131 |
| 2014/0376691 A1* | 12/2014 | Hoernig | G06T 11/006 378/37 |
| 2015/0125059 A1* | 5/2015 | Holmes | A61B 6/032 382/131 |
| 2015/0243045 A1* | 8/2015 | Ra | G06T 7/2033 382/131 |
| 2015/0243070 A1* | 8/2015 | Ra | A61B 6/503 382/131 |
| 2015/0287223 A1* | 10/2015 | Bresler | G06T 11/006 382/131 |
| 2015/0366525 A1* | 12/2015 | Sandholm | A61B 6/469 378/4 |
| 2016/0171726 A1* | 6/2016 | Nam | G06T 11/006 382/131 |
| 2016/0292849 A1* | 10/2016 | Lee | G06T 11/008 |
| 2016/0302751 A1* | 10/2016 | Grant | A61B 6/5205 |
| 2016/0324499 A1* | 11/2016 | Sen Sharma | A61B 6/5258 |

* cited by examiner

VIRTUAL PROJECTION IMAGE METHOD

FIELD OF THE INVENTION

The present disclosure relates to volume radiographic imaging and more particularly to methods and apparatus for eliminating aliasing effects and maintaining image quality while reducing the number of projection images obtained.

BACKGROUND

Digital radiographic volume imaging provides three-dimensional (3-D) images that have been reconstructed from a series of 2-D images taken over a succession of angles of the x-ray source relative to the detector. Acquisition of the 2-D projection images used for cone beam CT employs a large-area digital detector, such as a digital radiography (DR) detector that is typically used for conventional single projection radiography.

One factor that affects the quality of volume reconstruction relates to the number of 2-D projection images acquired. Projection images are generally obtained at evenly spaced angular increments; having images at a sufficient number of angles helps to provide enough data to minimize or eliminate aliasing effects such as view aliasing artifacts, typically appearing in the form of regularly spaced streaks, and other image processing problems.

Each projection image, however, requires exposure of the patient. Thus, although having more 2-D projection image data is advantageous for 3-D image reconstruction, it would be preferable to reduce the number of 2-D projection images that are obtained, thereby reducing exposure risks to the patient. In addition, it would be beneficial to reduce the required scan time in order to help reduce image reconstruction problems due to patient motion.

Thus, there would be advantages to volume imaging methods that can obtain sufficient projection image content for accurate volume reconstruction while reducing dosage requirements.

SUMMARY

It is an object of the present disclosure to advance the art of diagnostic 3-D volume imaging. Embodiments disclosed herein offer methods that can help to reduce patient exposure levels for 2-D projection image acquisition without compromising 3-D volume reconstruction results.

These and other aspects, objects, features and advantages of the present disclosure will be more clearly understood and appreciated from a review of the following detailed description of the preferred embodiments and appended claims, and by reference to the accompanying drawings.

According to an embodiment of the present disclosure, there is provided a method of generating a synthesized digital projection x-ray image, the method executed at least in part by a computer, the method comprising: a) acquiring a plurality of x-ray projection images, wherein each of the x-ray projection images has a corresponding acquisition angle; b) reconstructing a first volume image using the plurality of acquired x-ray projection images; c) performing a forward projection using the first reconstructed volume image that generates at least the following: (i) a preceding forward projection image that corresponds to a first acquired x-ray projection image at a first acquisition angle; (ii) a following forward projection image that corresponds to a second acquired x-ray projection image at a second acquisition angle that is adjacent the first acquisition angle; (iii) an intermediate forward projection image that corresponds to an intermediate angle that lies between the first acquisition angle and second acquisition angle; d) forming the synthesized projection image by a repeated sequence of: (i) identifying a candidate patch of pixels from within the intermediate forward projection image; (ii) identifying a first patch of pixels from the preceding forward projection image that closely matches the candidate patch of pixels and identifying a first acquired patch of pixels from the first acquired x-ray projection image that corresponds to the first patch of pixels from the preceding forward projection image; (iii) identifying a second patch of pixels from the following forward projection image that closely matches the candidate patch of pixels and identifying a second acquired patch of pixels from the second acquired x-ray projection image that corresponds to the second patch of pixels from the following forward projection image; (iv) combining the first acquired patch of pixels identified from step d)(ii) and the second acquired patch of pixels identified from step d (iii) to form a replacement patch of pixels and replacing the candidate patch of pixels from within the intermediate forward projection image with the replacement patch of pixels; e) repeating step c) to generate a first set of a plurality of intermediate forward projection images, wherein each member of the first set is at an angle between two adjacent acquisition angles of the plurality of acquired x-ray projection images; f) repeating step d) to generate each member of a second set of a plurality of synthesized projection images from the first set of intermediate forward projection images; g) reconstructing a second volume image using the plurality of acquired x-ray projection images and the second set of synthesized projection images; and h) generating and displaying a rendered 2-D image from the reconstructed second volume image.

DETAILED DESCRIPTION

The following is a detailed description of the preferred embodiments, reference being made to the drawings in which the same reference numerals identify the same elements of structure in each of the several figures.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "viewing practitioner", "observer", and "user" are considered to be equivalent and refer to the viewing practitioner or other person who views and manipulates an x-ray image on a display monitor or other viewing apparatus.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "modality" is a term of art that refers to types of imaging. Modalities for an imaging system may be conventional x-ray radiography, fluoroscopy or pulsed radiography, tomosynthesis, tomography, ultrasound, MRI, or other types of imaging. The term "subject" refers to the patient who is being imaged and, in optical terms, can be considered equivalent to the "object" of the corresponding imaging system.

The term "set", as used herein, refers to a non-empty set, as the concept of a collection of elements or members of a set is widely understood in elementary mathematics. The terms "subset" or "partial subset", unless otherwise explicitly stated, are used herein to refer to a non-empty proper subset, that is, to a subset of the larger set, having one or more members. For a set S, a subset may comprise the complete set S. A "proper subset" of set S, however, is strictly contained in set S and excludes at least one member of set S. A "partition of a set" is a grouping of the set's elements into non-empty subsets so that every element is included in one and only one of the subsets. Two sets are "disjoint" when they have no element in common.

The terms "image" and "image data" can be used interchangeably in the context of the present disclosure. An image that is captured by an imaging apparatus is processed, displayed, transmitted, and stored as image data.

For the image processing steps described herein, the terms "pixels" for picture image data elements, conventionally used with respect 2-D imaging and image display, and "voxels" for volume image data elements, often used with respect to 3-D imaging, can be used interchangeably. It should be noted that the 3-D tomosynthesis image is itself synthesized from image data obtained as pixels on a 2-D sensor array and displays as a rendered 2-D image from some angle of view. Thus, 2-D image processing and image analysis techniques can be applied to the 3-D volume image data. In the description that follows, image processing techniques described as operating upon pixels may alternately be described as operating upon the 3-D voxel data that is stored and represented in the form of 2-D pixel data for display. In the same way, techniques that operate upon voxel data can also be described as operating upon pixels.

In the image processing context of the present disclosure, "rendering" is the active process of generating and forming an image for display and generating the pattern of signals needed for displaying it to a user. Image data content that is used for rendering can be transformed from a 2-D or 3-D model (or models), typically stored as scene content in some type of scene file, into suitable patterns of light energy that are emitted from a display screen. A scene file contains objects in a strictly defined language or data structure, describing aspects of the image content such as geometry, viewpoint, texture, lighting, and shading information as a description of a scene. The data contained in the scene content or scene file is passed to a rendering program to be processed and output or streamed to a display driver or graphics processing unit (GPU) for direct presentation on a display or to a digital image or raster graphics image file. The digital image data file can alternately be available for presentation on a display. In general, the term "rendering" provides a transformation that can be considered as analogous to an "artist's rendering" of a scene; different artists working in different media can generate different renderings of the same scene content. The same image content can be rendered, for example, on a monochrome display or in color on a full color display.

With respect to an image detector, the term "pixel" refers to a picture element unit cell containing a photo-conversion circuit and related circuitry for converting incident electromagnetic radiation to an electrical signal.

In the context of the present disclosure, "volume imaging" refers to volume radiographic imaging modalities such as computed tomography (CT) or tomosynthesis imaging. Volume imaging methods form a volume 3-D image of a subject that can be viewed as a planar slice or plane section taken at a specified depth and angle. As noted previously, volume imaging obtains 3-D depth information by changing the relative angle between the x-ray source and the subject for each 2-D projection image that is acquired during scanning.

In the context of the present disclosure, the phrase "in signal communication" indicates that two or more devices and/or components are capable of communicating with each other via signals that travel over some type of signal path. Signal communication may be wired or wireless. The signals may be communication, power, data such as image data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

Reference is hereby made to an article by Bertram, Wiegert, Schafer, Rose, and Aach entitled "Directional View Interpolation for Compensation of Sparse Angular Sampling in Cone Beam CT" in *IEEE Transactions on Medical Imaging* Vol. 28, No. 7, July 2009, pp. 1011-1022.

Reference is also hereby made to U.S. Pat. No. 7,602,879 (Chen) and to U.S. Pat. No. 9,224,216 (Zamyatin).

Figure 1:
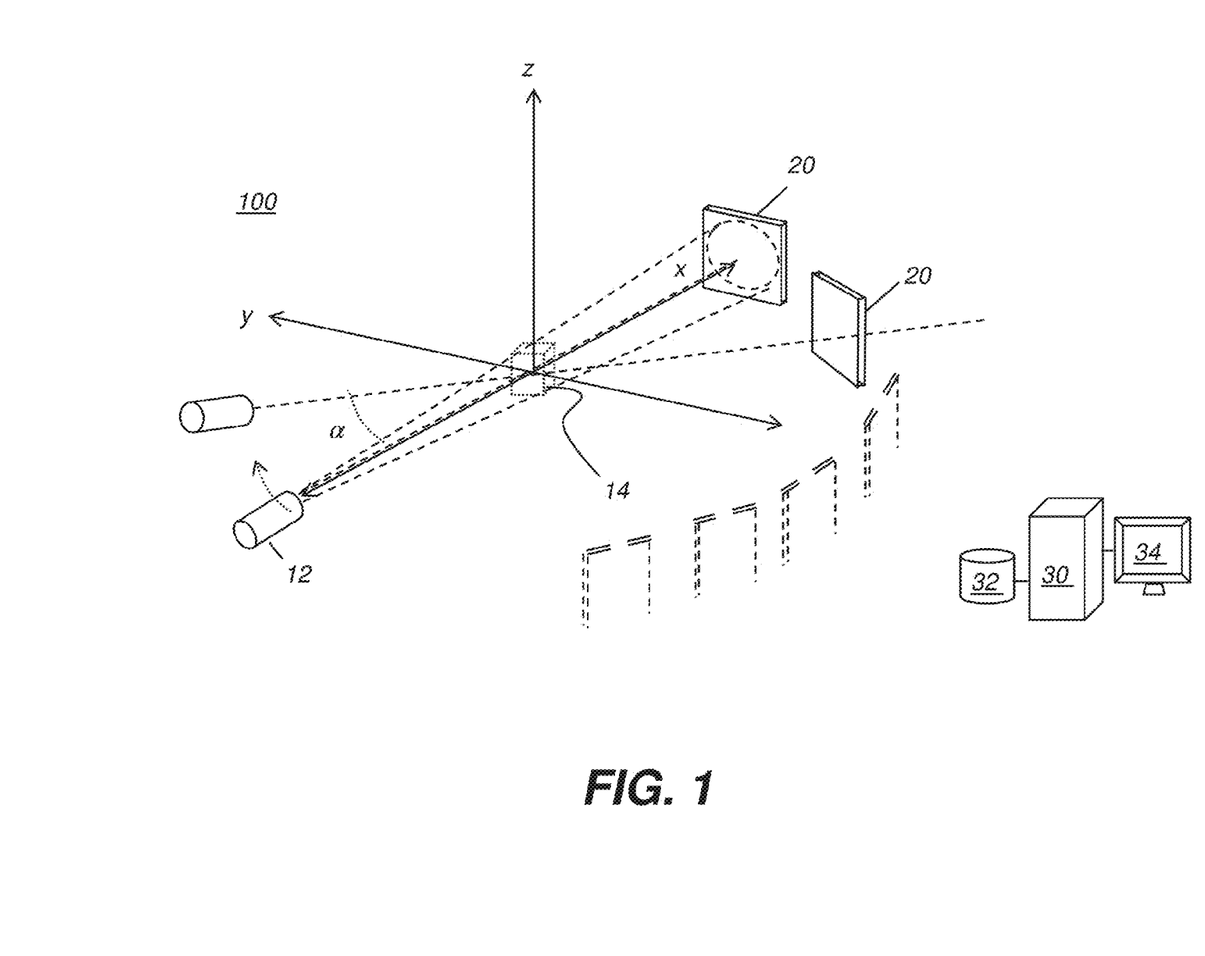
FIG. 1 shows, in schematic form, the scanning activity of a conventional CBCT imaging apparatus.

Referring to the perspective view of FIG. 1, there is shown, in schematic form and using enlarged distances for clarity of description, the activity of a conventional CBCT imaging apparatus 100 for obtaining, from a sequence of 2-D radiographic projection images, 2-D projection data that are used to reconstruct a 3-D volume image of an object or volume of interest, also termed a subject 14 in the context of the present disclosure. Cone-beam radiation source 12 directs a cone of radiation toward subject 14, such as a patient or other subject. For a 3-D or volume imaging system, the field of view (FOV) of the imaging apparatus is the subject volume that is defined by the portion of the radiation cone or field that impinges on a detector for each projection image. A sequence of x-ray projection images of the field of view is obtained in rapid succession at varying angles about the subject, such as one x-ray projection image at each 1-degree angle increment in an orbit of 180 degrees plus scan angle. X-ray digital radiation (DR) detector 20 is moved to different imaging positions about subject 14 in concert with corresponding movement of radiation source 12. FIG. 1 shows only a representative sampling of DR detector 20 positions, to illustrate schematically how projection data are obtained relative to the position of subject 14. Once the needed 2-D x-ray projection images are captured in this sequence, a suitable image reconstruction algorithm, such as filtered back projection (FBP) or other conventional technique, is used for reconstructing the 3-D volume image from the 2-D x-ray projection data. Image acquisition and program execution are performed by a computer 30 or by a networked group of computers 30 that are in image data signal communication with DR detector 20. Image processing and storage is performed using a computer-accessible memory 32. The 3-D volume image can be rendered for presentation on a display 34.

Embodiments of the present invention/disclosure can be readily adapted to the particular geometry of the CBCT or other volume imaging apparatus. In particular, an extremity imaging apparatus can generate volume images suitable for application of methods described herein.

Embodiments of the present disclosure provide approaches for reducing patient exposure and reducing artifacts by acquiring only a partial percentage of the N+M x-ray projection images that would otherwise be needed to for artifact-free reconstruction. Then, to obtain an ordered set of projection images that is sufficient to be used for tomographic reconstruction, a number of synthesized projection images M is generated and added to the acquired set of N projection images. This forms a larger set N+M of projection images, effectively providing a reduced angular spacing $\Delta\alpha'$ between adjacent projection images in the sequence used for reconstruction. The result is an enhanced 3-D reconstruction that can be substantially artifact-free.

It is noted that the number M of synthesized projection images that is generated can be smaller than, equal to, or larger than the number N of actual x-ray projection images. Examples given following show generation of a single synthesized image M corresponding to an angle midway between the corresponding angles of two adjacent x-ray projection images n and (n+1); the image obtained at this midway angle is represented herein using the notation n.5. Thus, in the examples shown here, M<N. However, multiple synthesized images M can be generated for angles between any two adjacent x-ray projection images n and (n+1). For example, two synthesized images M can be generated between any two adjacent x-ray projection images n and (n+1).

Figure 2:
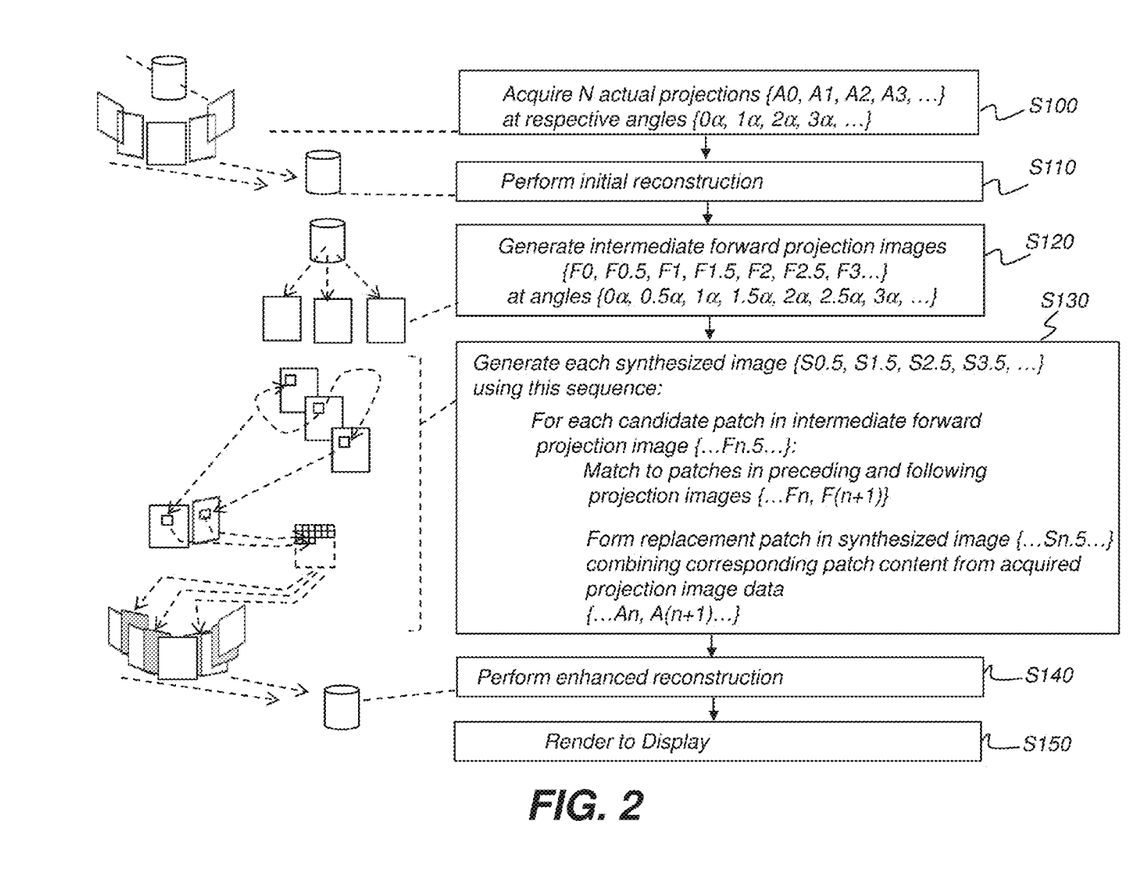
FIG. 2 is a logic flow diagram showing a sequence for enhanced 3-D volume reconstruction.

The logic flow diagram of FIG. 2 shows a procedural sequence for improving the quality of the image reconstruction and reducing artifacts, as well as reducing overall time requirements for projection imaging using synthesized images according to an embodiment of the present disclosure. In an acquisition step S100, an ordered set having a number N actual x-ray projection images {A0, A1, A2, A3, ... }, termed the "acquired" images in the context of the present disclosure, is obtained. Each x-ray projection image in the set is acquired at one of a corresponding sequence of N capture angles α as indicated in FIG. 1. The ordered set of acquired x-ray projection images can be considered ordered according to acquisition angle. In practice, x-ray projection images can be acquired in any order with respect to angle; the ordered set structure is convenient arrangement for illustrating the processing that follows, used to generate synthesized images.

In the example process shown in FIG. 2, every acquired x-ray projection image An has a corresponding capture angle $\alpha_n$ and is adjacent to a previous acquired x-ray projection image (n−1) with corresponding capture angle $\alpha_{n-1}$ and to a subsequent acquired x-ray projection image (n+1) with corresponding capture angle $\alpha_{n+1}$. Angular spacing between any two adjacent acquired x-ray projection images An in the sequence can be expressed as $\Delta\alpha$. From the ordered set of acquired projection images, an initial reconstruction step S110 forms a 3-D volume image using filtered back projection (FBP), using an iterative reconstruction process, or using some other suitable reconstruction algorithm.

In order to generate an expanded set of projection images for reconstruction, the procedural sequence of FIG. 2 performs a forward projection step S120 that generates an intermediate set of N+M forward projection images, shown herein as {F0, F0.5, F1, F1.5, F2, F2.5, F3 ... } at corresponding angles {0α, 0.5α, 1α, 1.5α, 2a, 2.5α, 3α, ... }. As described previously, the notation using "0.5" indicates angles between the acquisition angles α. Forward projection thus generates projection images at each of the angles α corresponding to the N actual x-ray projections and adds M additional projection images at intermediate angles, such as at angles n.5α, half-way between the original angles α.

Continuing with the FIG. 2 sequence, the process then proceeds to re-build a set of M synthesized projection images {S0.5, S1.5, S2.5, S3.5, ... } using the M added projection images as templates in a synthesized image generation step S130.

Figure 3:
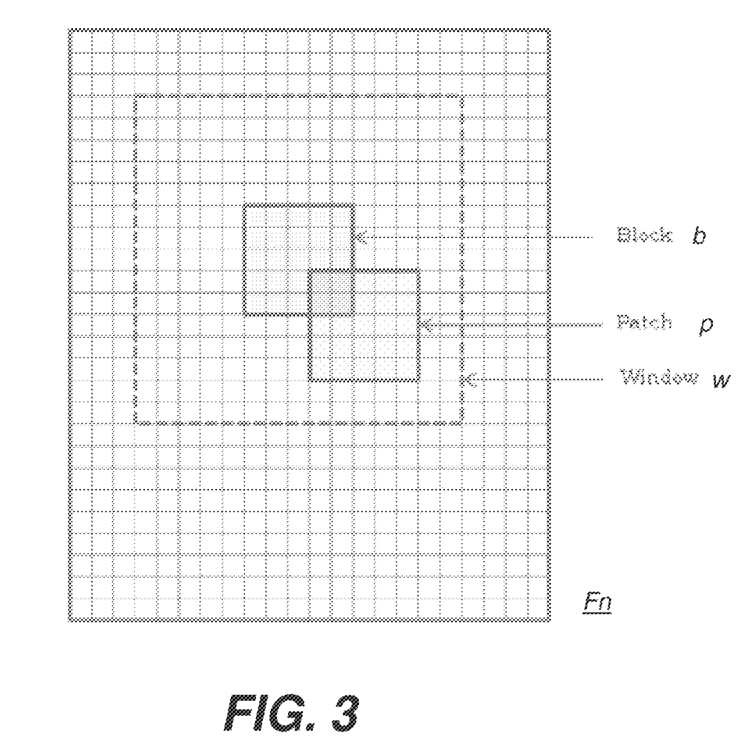
FIG. 3 is a schematic view that shows parts of a projection image according to an embodiment of the present disclosure.

Synthesized image generation step S130 of FIG. 2 proceeds as follows:

a) Each of the M additional forward projection images is segmented into an array of patches p of a predetermined patch size, such as 5×5 pixels, 7×7 pixels, or other suitable size, as represented in FIG. 3.

b) Each segmented patch p is mapped to its best matching patch in preceding and following forward projection images. Notationally, this can be considered as matching patch p in additional forward projection image Fn.5 to the corresponding image patch in preceding forward projection image Fn and in subsequent forward projection image F(n+1). Thus, for example, patch p in additional forward projection image F3.5 is matched with the corresponding patch in preceding forward projection image F3 and with the corresponding patch in subsequent forward projection image F4. Matching is performed by examining suitably sized blocks b within a larger window w. As shown by way of example in FIG. 3, a window, such as a 27×22 or 21×21 pixel window, is used to define a search area for the patch in each forward projection image. Any of a number of commonly used image matching metrics, also termed "comparison metrics", can be employed to measure patch similarity.

c) Note that the preceding forward projection image Fn is at the same angle α as the original acquired x-ray projection image An; the subsequent forward projection image F(n+1) is at the same angle α(n+1) as the original acquired x-ray projection image A(n+1). Thus, for example, preceding forward projection image F3 is at the same angle α3 as the original acquired x-ray projection image A3; the subsequent forward projection image F4 is at the same angle α4 as the original acquired x-ray projection image A4.

d) Patch p in the additional forward projection image Fn.5 is then replaced with updated content using the mapped patch data from the original acquired x-ray projection images An and A(n+1). This patch data from the original acquired x-ray projection images An and A(n+1) is combined in some way, such as averaged or weighted-averaged, in order to form the new data that replaces patch p from the additional forward projection image Fn.5. Thus, for example, to reconstitute patch p in additional forward projection image F3.5, the matching patch content from original acquired x-ray projection images A3 and A4 is combined.

The procedure given in steps a) through d) above is repeated for each patch p from the additional forward projection image Fn.5 until the additional forward projection image Fn.5 is fully formed as synthesized image Sn. This process is then repeated for the next additional forward projection image F(n+1).5 until all of the additional forward projection images are transformed into synthesized images {S0.5, S1.5, S2.5, S3.5, ... }. The synthesized images Sn can themselves be transmitted, stored, or displayed as needed.

To continue the sequence of FIG. 2, a final reconstruction step S140 executes, generating an enhanced 3-D volume reconstruction using the original acquired x-ray projection images {A0, A1, A2, A3, ... } supplemented by the set of synthesized images {S0.5, S1.5, S2.5, S3.5, ... }. The final reconstruction step S140 thus uses the combined set {A0, S0.5, A1, S1.5, A2, S2.5, A3, S3.5, ... } for forming the enhanced 3-D reconstruction. The data can then be displayed, rendered to a display in a display step S150. For step S150 rendering relates to the selection, processing, and display of a particular 2-D view of the reconstructed 3-D image scene content.

It is noted that various image conditioning processes can be applied to the volume data that is used for forward projection as well as for any of the generated forward projection or synthesized image data. Image conditioning improves the appearance of a projection image or of a synthesized image and can be applied as part of display rendering in order to change image sharpening or blurring, such as to improve image patch identification and processing, for example. Image conditioning such as metal artifacts reduction can be applied to the original acquired x-ray projection images or to the volume data that is reconstructed from the original x-ray projection images.

Figure 4A:
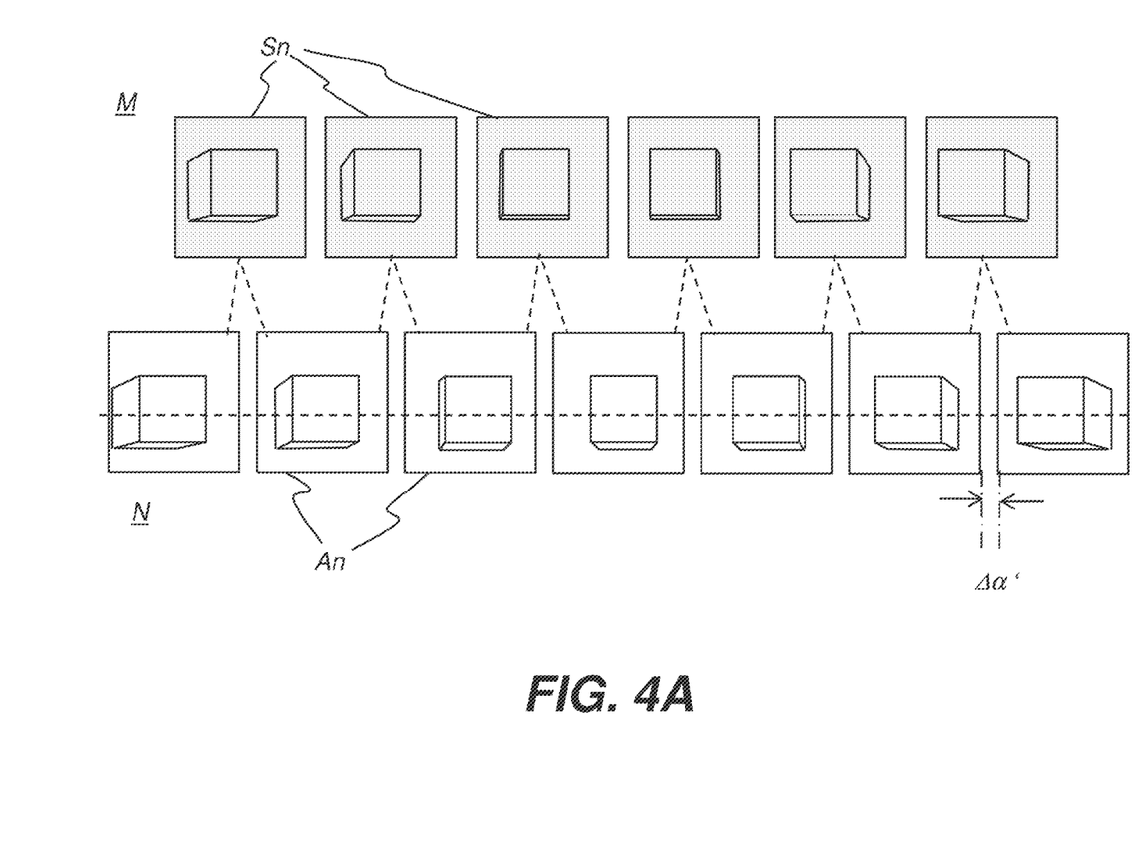
FIG. 4A is a schematic diagram that shows supplementing a set of acquired projection images with synthesized images.

FIG. 4A is a schematic diagram that shows supplementing the ordered set of N acquired x-ray projection images An with a set of M synthesized images Sn.

Figure 4B:
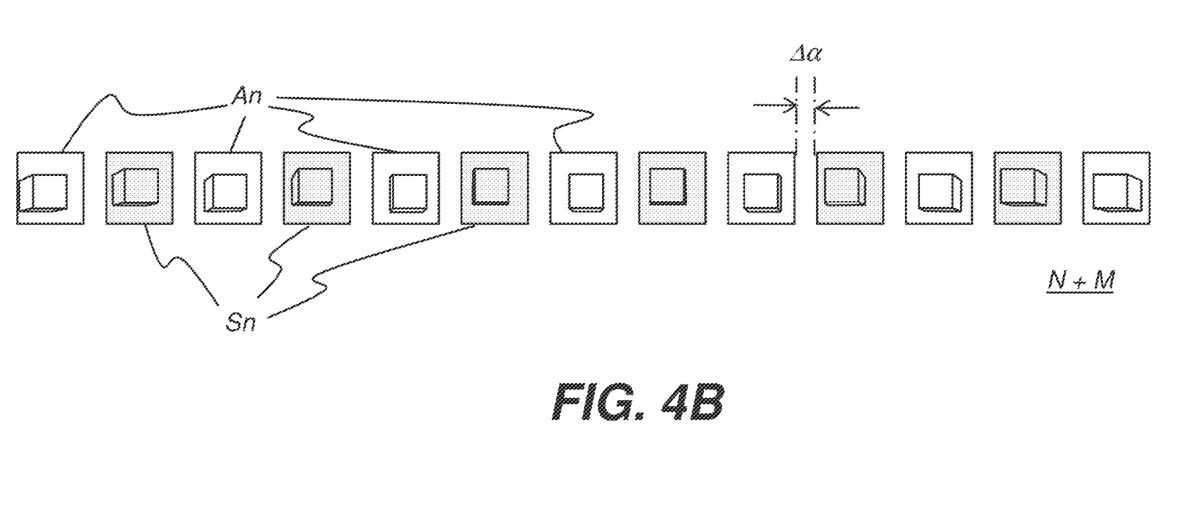
FIG. 4B is a schematic diagram that shows a combined set of acquired and synthesized images used for volume image reconstruction.

FIG. 4B is a schematic diagram that shows a combined set of acquired x-ray and synthesized images used for volume image reconstruction.

Figure 5:
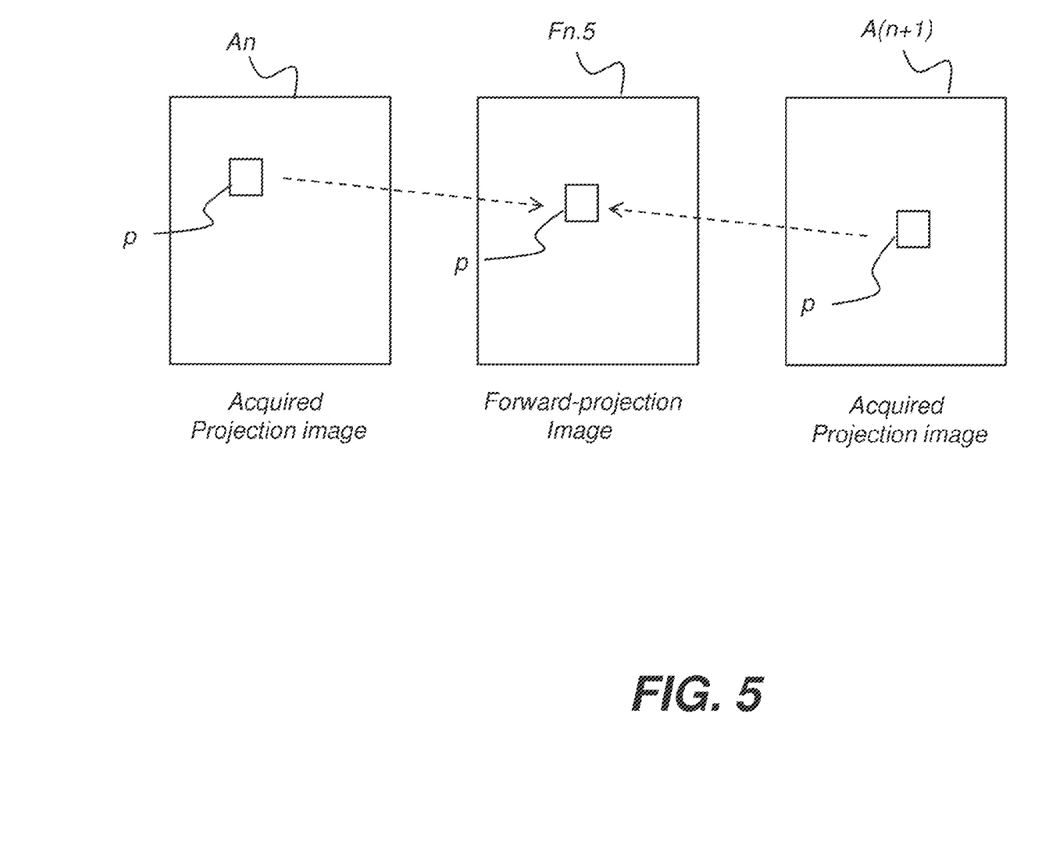
FIG. 5 is a schematic diagram that shows mapping patch content from two adjacent acquired projection images to a patch on an image generated using forward projection.

FIG. 5 shows mapping and combining patch content for a candidate patch from two adjacent acquired x-ray projection images to form patch p on an image generated Fn.5 using forward projection, in order to form synthesized image Sn.5 at completion of this processing.

A synthesized image constructed using the method described herein is formed as a mosaic of patches. Often, boundaries or seams between patches are readily discernable, causing perceptible degradation in the final reconstruction volume. One method to correct for seams is to perform a one dimensional smoothing filter across the seams. If the filter is applied uniformly, however, some sharp edges are overly smoothed and clash with the actual images.

According to a method of the present disclosure, seam smoothing is executed with respect to the forward projected image. The synthesized image seams are smoothed by applying the following one directional algorithm vertically and horizontally:

(i) Identify adjacent pixels p1 and p2, each belonging to a different block.

(ii) Calculate the difference ΔSyn of the two pixels, p1 and p2.

(iii) Calculate the difference ΔAct, of pixels in the same location in the forward projected image.

(iv) Compare ΔSyn, and ΔAct. If |ΔSyn|<|ΔAct|, then make no change to pixel values; otherwise add one-third of the difference to p1 and remove one third of the difference from p2.

The approach outlined above can help to dampen the seam boundary adaptively and limit image degradation that can otherwise occur with a global smoothing approach.

Figure 6:
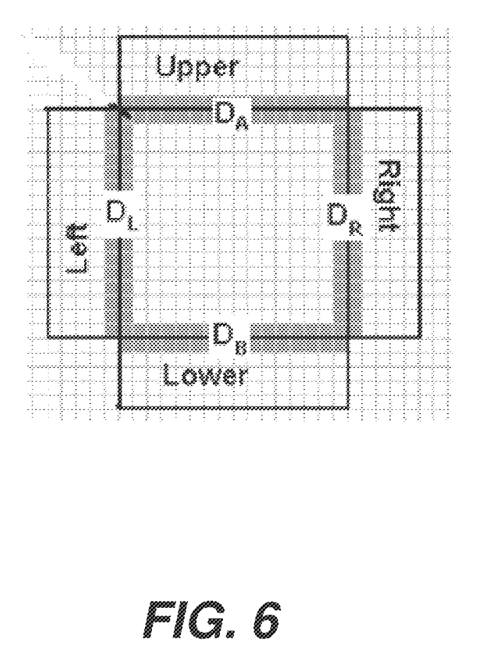
FIG. 6 is a schematic diagram showing boundary matching.

To help mitigate blocking artifacts, the Applicants can alternately use an improved spatial similarity metric, formed by adding terms that encourage spatial correlation with neighboring patches. This includes two types of terms: a boundary matching energy and a flow field smoothing energy. FIG. 6 shows the meaning of boundary matching terms $D_A$, $D_R$, $D_B$, $D_L$, used herein.

The basic energy relationship E can be expressed as follows:

$$E = \text{block matching energy} + \text{boundary matching energy} + \text{flow field smoothing energy} \quad (1)$$

Block matching energy can then be formulated as follows:

$$E_{blockmatching} = \sum_{(x,y) \in S(B)} |f_{left}(x-u, y-v) - f_{right}(x+u, y+v)| \quad (2)$$

A flow field term expresses the consistency of flow direction:

$$E_{flow\ field} = \sum_{i \in neighbors} |(u - u_i)| + |v - v_i| \quad (3)$$

where, as shown in FIG. 6:

$$\text{neighbors} = \{\text{upper, lower, left, right}\} \quad (4)$$

$$E_{boundary\ matching} = D_A + D_B + D_L + D_R \quad (5)$$

$$D_A(u, v) = \sum_{x=0}^{N-1} |0.5(f_{left}(x-u, y-v) - f_{right}(x+u, y+v)) - f^{k-1}(x, y-1)| \quad (6)$$

Embodiments of the present disclosure show improvement over earlier interpolation methods, particularly with respect to reduction of artifacts in general, particularly view aliasing artifacts.

Figure 7A:
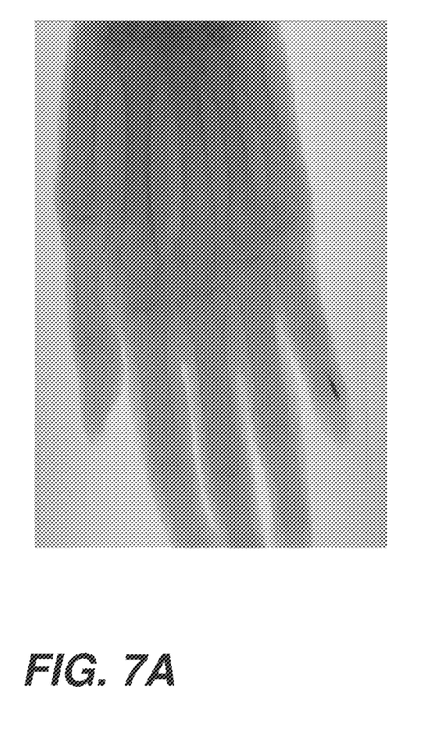
FIG. 7A shows an acquired projection image.
Figure 7B:
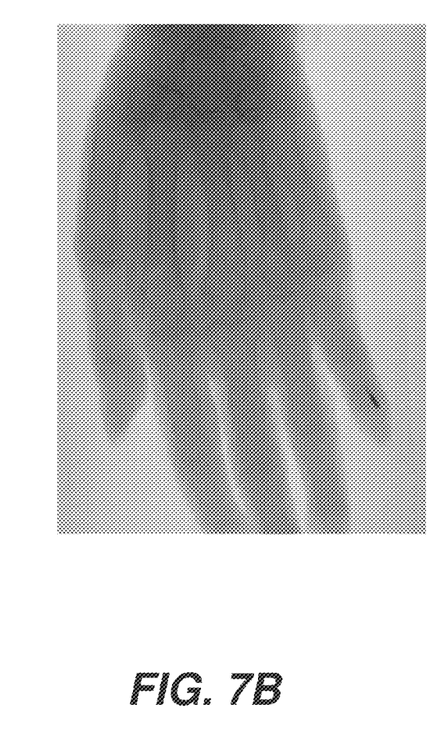
FIG. 7B shows a synthesized projection image generated according to an embodiment of the present disclosure.

By way of example, FIG. 7A shows an acquired projection image An of a hand. FIG. 7B shows a synthesized image generated according to an embodiment of the present disclosure. The synthesized image can be displayed or can be used with acquired projection images for volume reconstruction.

Consistent with one embodiment, the present disclosure utilizes a computer program with stored instructions that control system functions for image acquisition and image data processing for image data that is stored and accessed from an electronic memory. As can be appreciated by those skilled in the image processing arts, a computer program of an embodiment of the present disclosure can be utilized by a suitable, general-purpose computer system, such as a personal computer or workstation that acts as an image processor, when provided with a suitable software program so that the processor operates to acquire, process, transmit, store, and display data as described herein. Many other types of computer systems architectures can be used to execute the computer program of the present disclosure, including an arrangement of networked processors, for example.

The computer program for performing the method of the present disclosure may be stored in a computer readable storage medium. This medium may comprise, for example: magnetic storage media such as a magnetic disk such as a hard drive or removable device or magnetic tape; optical storage media such as an optical disc, optical tape, or machine readable optical encoding; solid state electronic storage devices such as random-access memory (RAM), or read only memory (ROM); or any other physical device or medium employed to store a computer program. The computer program for performing the method of the present disclosure may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present disclosure may make use of various image manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of generating a synthesized digital projection image, the method executed at least in part by a computer, the method comprising:
    a) acquiring a plurality of x-ray projection images, wherein each of the x-ray projection images has a corresponding acquisition angle;
    b) reconstructing a first volume image using the plurality of acquired x-ray projection images;
    c) performing a forward projection using the first reconstructed volume image that generates at least the following:
        (i) a preceding forward projection image that corresponds to a first acquired x-ray projection image at a first acquisition angle;
        (ii) a following forward projection image that corresponds to a second acquired x-ray projection image at a second acquisition angle that is adjacent the first acquisition angle; and
        (iii) an intermediate forward projection image that corresponds to an intermediate angle that lies between the first acquisition angle and second acquisition angle;
    d) forming the synthesized projection image by a repeated sequence of:
        (i) identifying a candidate patch of pixels from within the intermediate forward projection image;
        (ii) identifying a first patch of pixels from the preceding forward projection image that closely matches the candidate patch of pixels and identifying a first acquired patch of pixels from the first acquired x-ray projection image that corresponds to the first patch of pixels from the preceding forward projection image;
        (iii) identifying a second patch of pixels from the following forward projection image that closely matches the candidate patch of pixels and identifying a second acquired patch of pixels from the second acquired x-ray projection image that corresponds to the second patch of pixels from the following forward projection image; and
        (iv) combining the first acquired patch of pixels identified from step d)(ii) and the second acquired patch of pixels identified from step d)(iii) to form a replacement patch of pixels and replacing the candidate patch of pixels from within the intermediate forward projection image with the replacement patch of pixels;
    e) repeating step c) to generate a first set of a plurality of intermediate forward projection images, wherein each member of the first set is at an angle between two adjacent acquisition angles of the plurality of acquired x-ray projection images;
    f) repeating step d) to generate each member of a second set of a plurality of synthesized projection images from the first set of intermediate forward projection images;
    g) reconstructing a second volume image using the plurality of acquired x-ray projection images and the second set of synthesized projection images; and
    h) generating and displaying a rendered 2-D image from the reconstructed second volume image.

2. The method of claim 1 further comprising storing or transmitting the rendered 2-D image.

3. The method of claim 1 further comprising conditioning the first volume image prior to performing the forward projection.

4. The method of claim 3 wherein conditioning comprises processing to reduce metal-related artifacts.

5. The method of claim 1 further comprising conditioning one or more of the preceding, intermediate, or following forward projection images.

6. The method of claim 5 wherein conditioning comprises adjusting image sharpness.

7. The method of claim 5 wherein conditioning comprises adjusting image contrast.

8. The method of claim 1 wherein the acquisition angles for the x-ray projection images are evenly spaced.

9. The method of claim 1 wherein combining comprises computing an average value.

10. The method of claim 1 further comprising storing or transmitting the reconstructed second volume image.

11. A method of generating a synthesized digital projection image, the method executed at least in part by a computer, the method comprising:
 a) obtaining a first ordered set of acquired x-ray projection images, wherein the ordering of the first ordered set is according to an acquisition angle for each acquired projection image;
 b) reconstructing a first volume image using the first ordered set of acquired x-ray projection images;
 c) performing a forward projection using the first reconstructed volume image that generates at least the following:
  (i) a preceding forward projection image that corresponds to a first acquired projection image from the first ordered set at a first acquisition angle;
  (ii) a following forward projection image that corresponds to a second acquired projection image from the first ordered set at a second acquisition angle that is adjacent the first acquisition angle; and
  (iii) an intermediate forward projection image that corresponds to an intermediate angle that lies between the first acquisition angle and second acquisition angle;
 d) forming the synthesized projection image by a repeated sequence of:
  (i) identifying a candidate patch of pixels from within the intermediate forward projection image;
  (ii) identifying a first patch of pixels from the preceding forward projection image that closely matches the candidate patch of pixels and identifying a first acquired patch of pixels from the first acquired projection image that corresponds to the first patch of pixels from the preceding forward projection image;
  (iii) identifying a second patch of pixels from the following forward projection image that closely matches the candidate patch of pixels and identifying a second acquired patch of pixels from the second acquired projection image that corresponds to the second patch of pixels from the following forward projection image; and
  (iv) combining the first acquired patch of pixels identified from step d)(ii) and the second acquired patch of pixels identified from step d)(iii) to form a replacement patch of pixels and replacing the candidate patch of pixels from within the intermediate forward projection image with the replacement patch of pixels; and
 e) storing, transmitting, or displaying the synthesized projection image.

12. A method of generating an interpolated projection image, the method executed at least in part by a computer and comprising:
 a) accessing a volume image generated using a plurality of projection images;
 b) generating a left, right, and middle forward-projected image using forward projection through the volume, the left, right, and middle forward-projected images each comprised of a plurality of pixels wherein each of the plurality of pixels has a value that is indicative of material density;
 c) repeating the sequence of:
  1) identifying a first region of interest in the middle image, the first region of interest defined by a first plurality of pixels;
  2) determining a second region of interest in the right image corresponding to the first region of interest in the middle image, the second region of interest defined by a second plurality of pixels;
  3) determining a third region of interest in the left image corresponding to the first region of interest in the left image, the third region of interest defined by a third plurality of pixels; and
  4) forming the interpolated projection image, by, for each pixel in the first region of interest:
   i) using a comparison metric, comparing the pixel to the second and third plurality of pixels;
   ii) selecting one pixel from each of the second and third plurality of pixels in accordance with the comparison metric;
   iii) forming a replacement pixel using the two selected pixels;
   iv) identifying a candidate pixel in the interpolated image corresponding with the pixel; and
   v) replacing the candidate pixel with the replacement pixel; and
 d) displaying, storing, or transmitting the formed interpolated projection image.

13. The method of claim 12 wherein forming the replacement pixel comprises conditioning pixel data with image data from one or more corresponding pixels from the plurality of projection images.

14. The method of claim 12 wherein the comparison metric relates to spatial location.

15. The method of claim 12 wherein the comparison metric relates to pixel data value.

* * * * *